(12) United States Patent
Nakajima et al.

(10) Patent No.: US 6,207,913 B1
(45) Date of Patent: Mar. 27, 2001

(54) OPERATION SWITCH

(75) Inventors: Hirokatsu Nakajima; Junichi Kojima; Shinichi Sato, all of Nagoya (JP)

(73) Assignee: Harness System Technologies Research, Ltd., Nagoya (JP)

( * ) Notice: Subject to any disclaimer, the term of this patent is extended or adjusted under 35 U.S.C. 154(b) by 0 days.

(21) Appl. No.: 09/387,848

(22) Filed: Sep. 1, 1999

(30) Foreign Application Priority Data

Jan. 29, 1999 (JP) .................................................. 11-022763

(51) Int. Cl.⁷ ...................................................... H01H 9/16
(52) U.S. Cl. .......................... 200/314; 200/5 R; 200/313
(58) Field of Search .............................. 200/5 R, 18, 13, 200/520, 308, 310–317, 329, 341

(56) References Cited

U.S. PATENT DOCUMENTS

| 4,454,399 | * | 6/1984 | Suzuki | 200/314 |
| 5,432,684 | * | 7/1995 | Fye et al. | 362/30 |
| 5,464,955 | * | 11/1995 | Cole | 200/317 |
| 5,861,589 | * | 1/1999 | Sato et al. | 200/5 R |
| 6,087,601 | * | 7/2000 | Callender et al. | 200/5 A |

FOREIGN PATENT DOCUMENTS

| 197 25 140 A1 | 12/1997 | (DE) | B60H/1/02 |
| 2 699 871 A1 | 7/1994 | (FR) | B60K/37/06 |
| 2 760 213 A1 | 9/1998 | (FR) | B60H/1/00 |
| WO 96/30255 | 10/1996 | (WO) | B63B/25/22 |

* cited by examiner

*Primary Examiner*—Michael Friedhofer
(74) *Attorney, Agent, or Firm*—Oliff & Berridge, PLC.

(57) ABSTRACT

An operation switch is arranged in a manner that switch knobs 1 and 2 each for selecting one of related plural functions is provided, and a display portion for displaying the one of related plural functions selected by the corresponding switch knob is provided for each of the switch knobs 1 and 2. Thus, when the switch knob 1 or 2 is operated, the desired function relating to the switch knob 1 or 2 thus operated can be selected among the plural functions for adjusting the blowing direction and an air flow rate and also the selected function can be displayed at the switch knob 1 or 2 thus operated.

6 Claims, 6 Drawing Sheets

OPERATION SWITCH

BACKGROUND OF THE INVENTION

1. Field of the Invention

The present invention relates to an operation switch used in an audio reproducing device, an air conditioner or the like which are disposed within a vehicle.

2. Description of the Related Art

As an example, the operation switch for the air conditioner is classified into the following three systems.

As shown in FIG. 6, the first system is arranged in a manner that push-type switch knobs 100, 101, 102, 103, 104 and 105 each having a display portion M and an indicator N are disposed in correspondence with a plurality of function portions, respectively. In this system, the display portions M are disposed above switch elements (not shown) for selecting the function portions, respectively. When one of the switch knobs 100 etc. is pushed, the corresponding indicator N is lightened so as to make an operator possible to determine whether or not the corresponding function is operated or not. An air flow rate is adjusted by a not-shown switch knob.

As shown in FIG. 7, the second system is arranged in a manner so as to select the functions (modes) and adjust an air flow rate that there are disposed a display portion 110 for selectively displaying a plurality of functions and two switch knobs, that is, a push-type switch knob 111 for switching the modes and a seesaw type switch knob 112 for adjusting an air flow rate, in the example of this figure. Thus, in this system, the display content of the display portion 110 changes every time the push-type switch knob 111 is pushed. For example, every time the push-type switch knob 111 is pushed, the displayed content changes in an order of ①→②→③→④→①. Further, when the right side or the left side of the seesaw type switch knob 112 is pushed, the corresponding one of plural indicators N1, N2 and N3 provided at the upper portion of the seesaw type switch knob is lightened.

As shown in FIG. 8, the third system is arranged in a manner that there are disposed a display portion 120 for selectively displaying a plurality of functions and an air flow rate, a push-type switch knob 121 for switching modes and a seesaw type switch knob 122 for adjusting an air flow rate. Thus, in this system, the display content of the display portion 120 changes every time the corresponding one of the switch knobs is pushed. To be more concrete, in this system, the display content 120a of the display portion 120 changes every time the push-type switch knob 121 is pushed, whilst when the right side or the left side of the seesaw type switch knob 122 is pushed, the adjusted air flow rate is displayed.

However, each of the aforesaid systems has the following problems.

In the first system, since the switch knobs each having the display portion corresponding to the associated one of the functions are required to be provided for the respective functions, the area occupied by the switch knobs becomes large at the time of arranging them. Thus, the sizes of the respective switch knobs are likely restricted. As a result, there arises a problem that the operability of the operation switch is degraded in the case where the sizes of the respective switch knobs are required to be small in accordance with the increase of the functions, for example.

In each of the second and third systems, since the display portion is required to be provided separately from the switch knobs, there arises a problem that the operation switch requires a large space due to the provision of the space for the display portions.

SUMMARY OF THE INVENTION

The present invention has been performed in order to solve such conventional problems and hence an object of the present invention is to provide an operation switch which can secure the good operability and a sufficient area for a display portion even if the space for the operation switch is small.

In order to achieve the aforesaid object, an operation switch according to the present invention is arranged in a manner that one or at least two switch knobs each for selecting one of related plural functions is provided, and a display portion for displaying the one of related plural functions selected by the corresponding switch knob is provided for each of the switch knobs.

According to such a configuration, when one of the switch knobs is operated, the desired function relating to the switch knob thus operated can be selected among the plural functions and also the selected function can be displayed at the switch knob thus operated. Accordingly, it is possible to secure the good operability and a sufficient area for a display portion even if the space for the operation switch is small.

The operation switch according to the present invention may be arranged in a manner that the related plural functions are changed sequentially in a predetermined order each time the switch knob is subjected to a constant operation.

The operation switch according to the present invention is preferably arranged in a manner that a switch element for selecting the related plural functions is provided on a rear surface side of each of the switch knobs.

The operation switch according to the present invention may be arranged in a manner that the display portion has a plurality of rooms provided within the switch knob, light sources respectively provided in the plurality of rooms and function displays respectively being clearly visible by turning the light sources on, and the display portion is arranged in a manner that, when the switch knob is operated, a desired one of the light sources is turned on to display the one of the related plural functions selected by the operation of the switch knob.

According to such an arrangement, when the desired light source is turned on in response to the operation of the push knob, mainly the corresponding room is brightened by the light source thereby to clearly indicate the function display relating to the room. Accordingly, the function selected by the operation of the switch knob can be confirmed with high visibility.

The operation switch according to the present invention is preferably arranged in a manner that the function displays are formed on a transparent or semitransparent plate. Further, the operation switch according to the present invention is preferably arranged in a manner that the function displays are formed on the plate in a manner of paint omitting display and the plate is subjected to light diffusion painting.

The operation switch according to the present invention may be arranged in a manner that the switch knob is formed by a push knob which selects one of the plural functions when being pushed.

The present disclosure relates to the subject matter contained in Japanese patent application No. Hei. 11-22763 (filed on Jan. 29, 1999) which is expressly incorporated herein by reference in its entirely.

BRIEF DESCRIPTION OF THE DRAWINGS

FIG. 5A, FIG. 5B, FIG. 5C, FIG. 5D, FIG. 5E, FIG. 5F, FIG. 5G and FIG. 5H are diagrams showing the display contents of the operation switch according to the embodiment, in which FIG. 5A, FIG. 5B, FIG. 5C and FIG. 5D show the changes of the display when the upper side push knob 1 for adjusting the blowing direction is switched, whilst FIG. 5E, FIG. 5F, FIG. 5G and FIG. 5H show the changes of the display when the lower side push knob 2 for adjusting an air flow rate is switched.

DETAILED DESCRIPTION OF THE PREFERRED EMBODIMENTS

An embodiment of the present invention will be described concretely.

Figure 1:
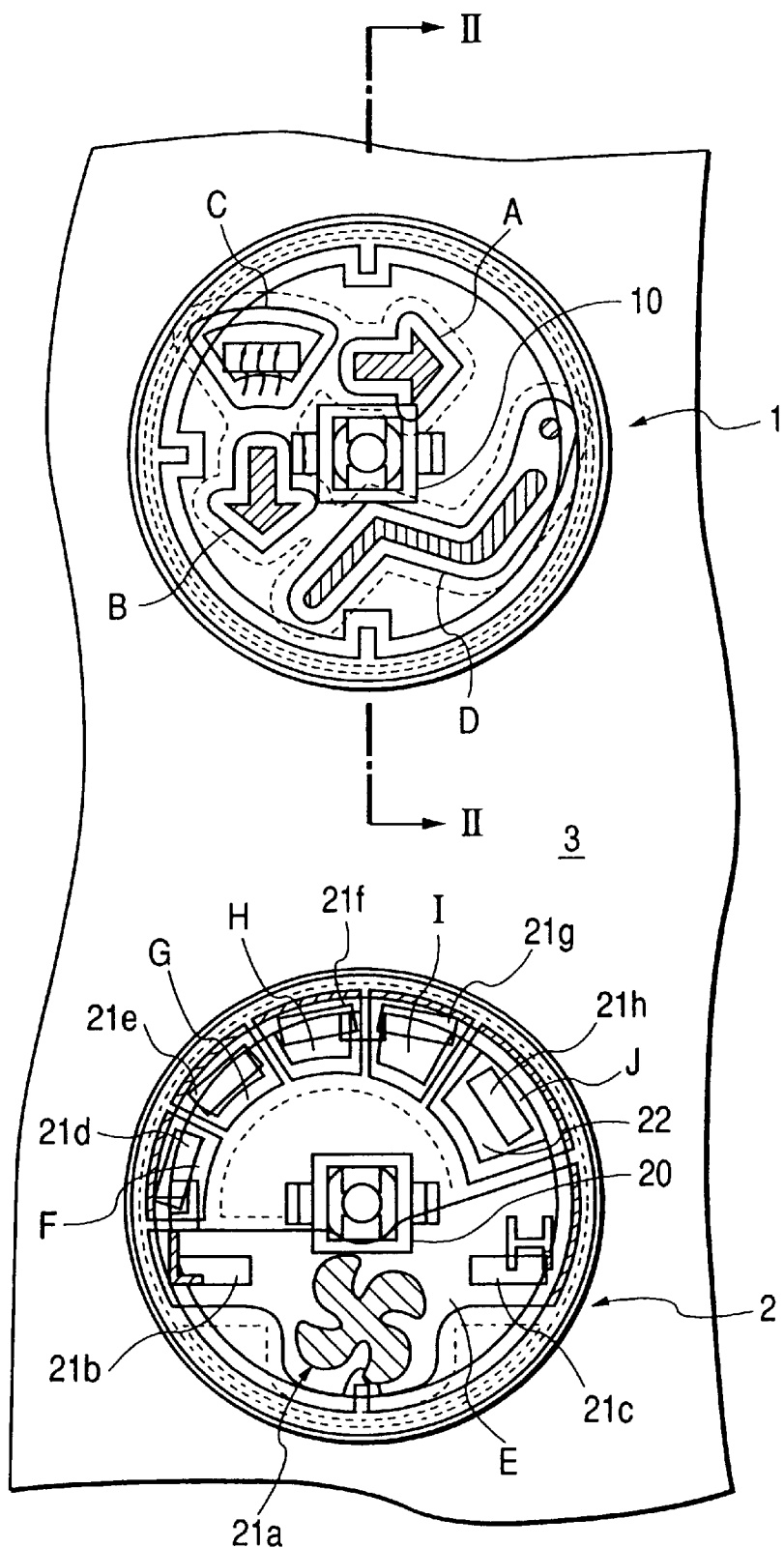
FIG. 1 is a front view mainly showing the inner structure of an operation switch according to an embodiment of the present invention.
Figure 2:
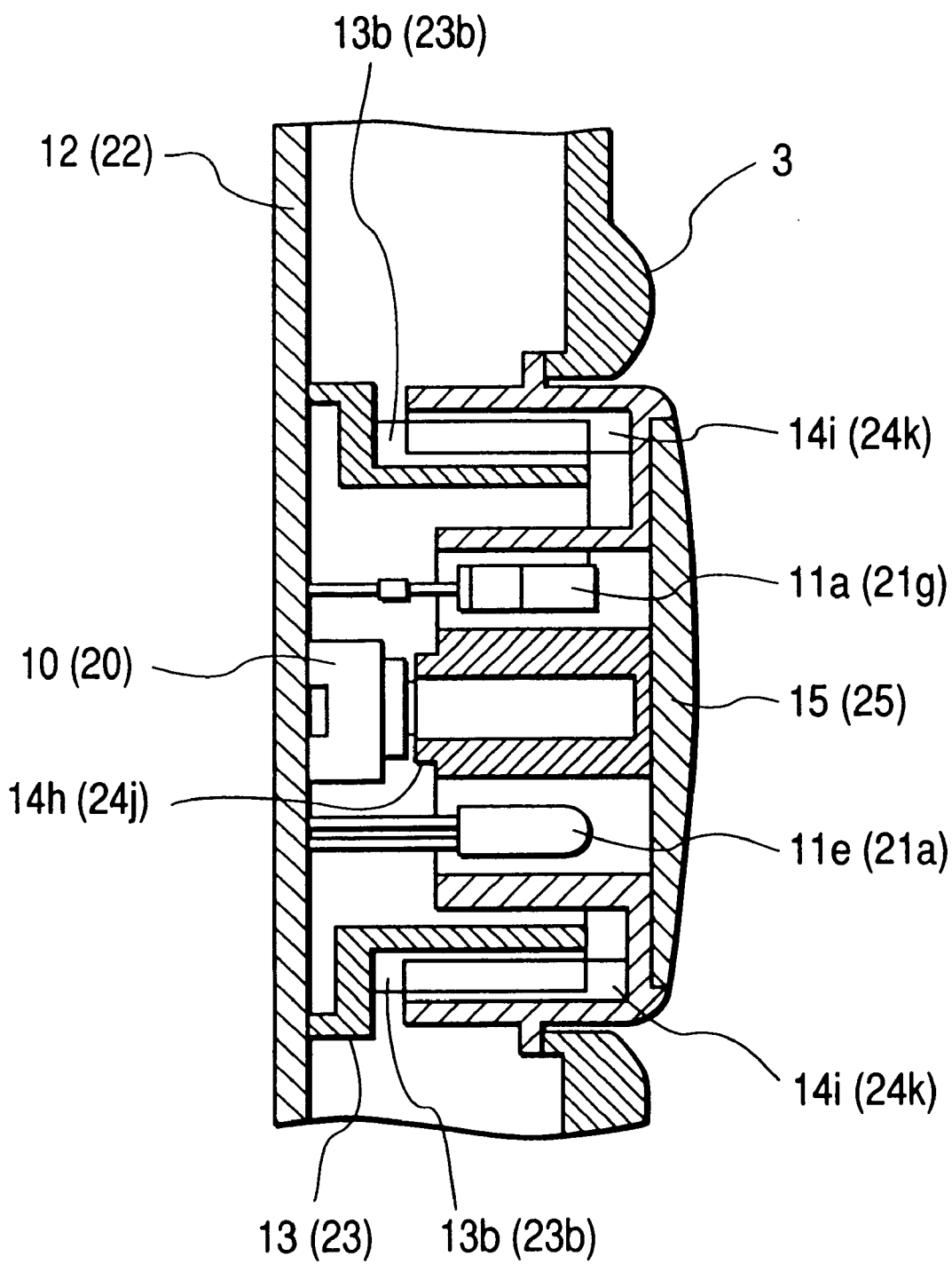
FIG. 2 is a sectional diagram of the operation switch cut along a line II—II in FIG. 1.

FIG. 1 is a front diagram mainly showing the inner structure of an operation switch according to the embodiment, and FIG. 2 is a sectional diagram of the operation switch cut along a line II—II in FIG. 1.

In this operation switch, two push knobs 1, 2 are disposed at the upper and lower sides of an air conditioner device portion in a front panel 3 of an automobile, respectively. The push knob 1 on the upper side is for adjusting the blowing direction and the push knob 2 on the lower side is for adjusting an air flow rate.

Figure 3:
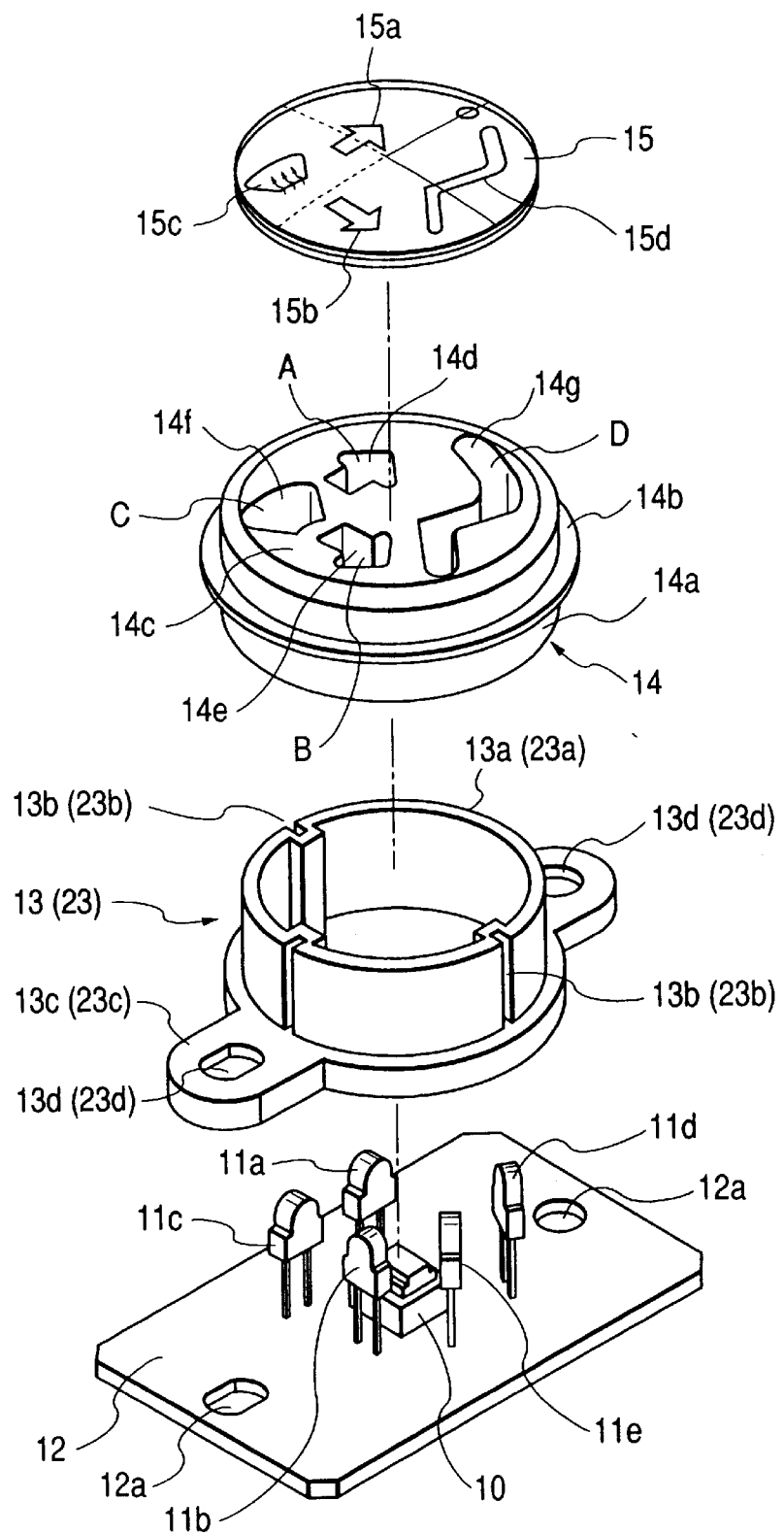
FIG. 3 is an exploded perspective view mainly showing an upper side one of upper and lower side push knobs provided in the operation switch according to the embodiment.

The inner structure of the push knob 1 on the upper side is arranged as show n in FIG. 3 to include a print circuit board 12 having a push-type switch element 10 and five light sources 11a, 11b, 11c, 11d and 11e formed by light emitting diodes (LEDs) or the like, a switch guide 13, a base switch 14 and a smoke plate 15 formed by a semitransparent resin plate or the like. On the inner surface side of the smoke plate 15, a plurality of functions relating to the adjustment of the blowing direction are displayed. For example, in the example shown in the figure, a forward blowing display 15a, a hoot blowing display 15b and a front window blowing display 15c are displayed in a manner of the paint omitting display, and further a human shape display 15d is displayed in correspondence with these function display portions in a manner of the paint omitting display. The print omitting display means such a painting that the painting of the function display portions such as the forward blowing display 15a or the like is omitted and the area of the smoke plate other than these function display portions is painted. On the inner surface side of the smoke plate 15, the entire surface or the paint omitting display portions thereof is subjected to the light diffusion painting. Incidentally, the paint omitting display and the light diffusion painting may be effected on the outer surface side of the smoke plate 15.

The base switch 14 is arranged in a manner that a brim portion 14b is formed at the intermediate portion along the vertical direction on the outer side of a cylindrical member 14a, and an upper lid portion 14c is formed at the inner side of the cylindrical member 14a. Further, side walls 14d, 14e, 14f and 14g are formed so as to hang down from the upper lid portion 14c thereby to form a plurality of rooms A, B, C and D, respectively. The roomA corresponds to the forward blowing display 15a, the room B corresponds to the hoot blowing display 15b, the room C corresponds to the front window blowing display 15c and the room D corresponds to the human shape display 15d. These rooms A to D are formed in a manner that opening shapes thereof respectively corresponding to the shapes of the forward blowing display 15a to the human shape display 15d are formed continuously along the vertical direction while maintaining the shapes. The light sources 11a to 11e are disposed in correspondence to the function display portions of the forward blowing display 15a or the like of the respective rooms A to D. To be more concrete, the light source 11a, the light source 11b, light source 11c, and the light sources 1id and 11e are disposed in correspondence to the forward blowing display 15a of the room A, the hoot blowing display 15b of the room B, the front window blowing display 15c of the room C and the human shape display 15d of the room D, respectively.

As shown in FIG. 2, an inner side cylindrical portion 14h is formed at the center portion on the lower side of the upper lid portion 14c so that the inner side cylindrical portion pushes the push-type switch element 10 to change the terminals. Further, a convex portion 14i which engages with a groove 13b formed at a substantially cylindrical portion 13a of the switch guide 13 is formed on the inner surface side of the cylindrical member 14a. The convex portion 14i engages with the groove 13b of the switch guide 13, so that the base switch 14 is made impossible to rotate relative to the switch guide 13.

The switch guide 13 is provided with a mounting base 13c at the lower side of the substantially cylindrical portion 13a, whereby the switch guide is mounted to the not-shown portion of the front panel 3 by means of screws or the like through mounting holes 13d provided at the mounting base 13c and mounting holes 12a provided at the print circuit board 12.

As described above, the print circuit board 12 is provided with the push-type switch element 10 and the five light sources 11a, 11b, 11c, 11d and 11e formed by LEDs or the like. When the push-type switch element 10 is switched, a not-shown control circuit controls to turn on and off the five light sources 11a to 11e in response to the switching operation and a not-shown opening/closing means is controlled to blow air in accordance with the selected blowing function.

Figure 4:
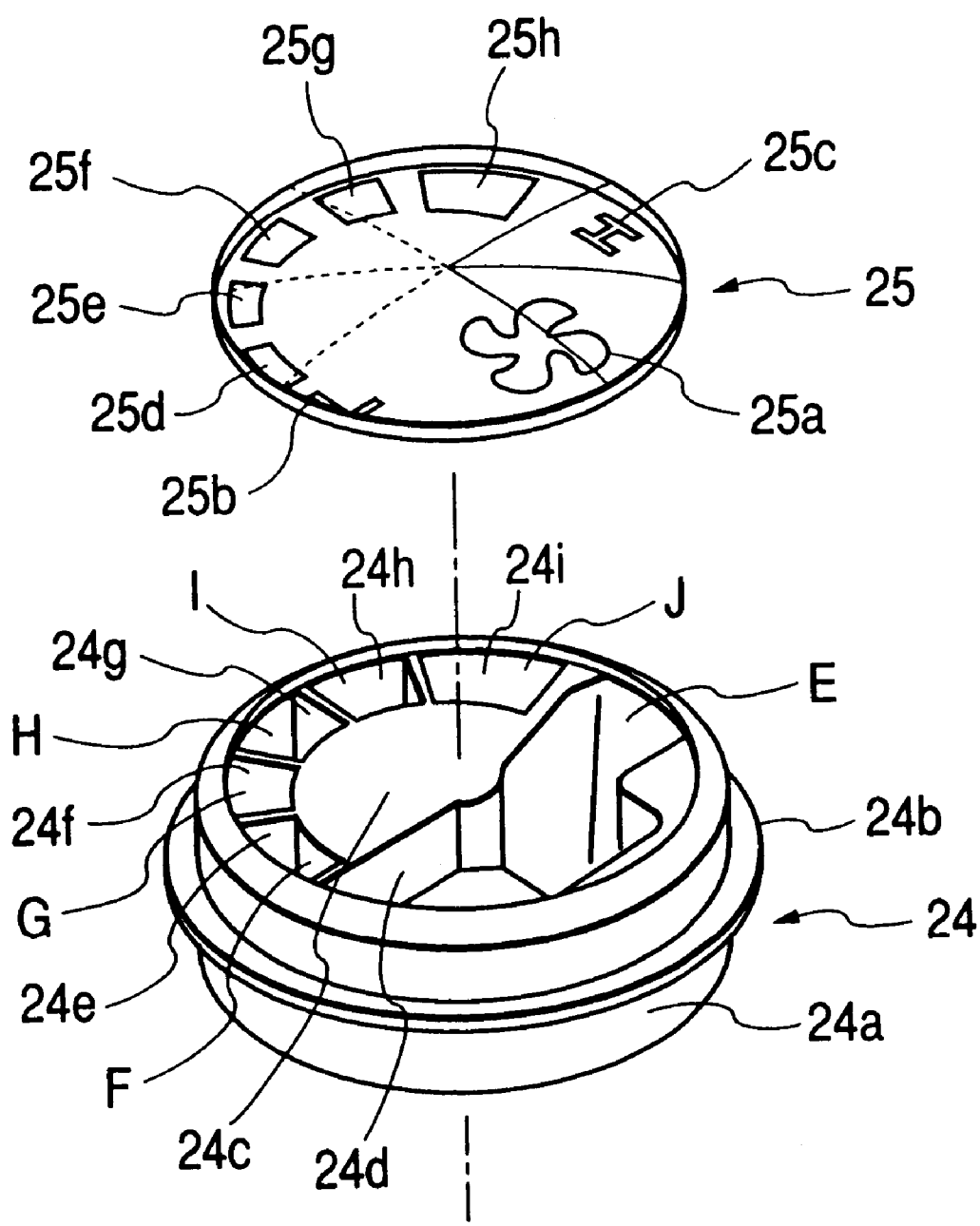
FIG. 4 is an exploded perspective view showing a part of the lower side one of the upper and lower side push knobs provided in the operation switch according to the embodiment.
Figure 5A:
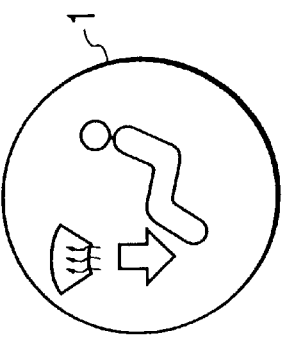
Figure 5B:
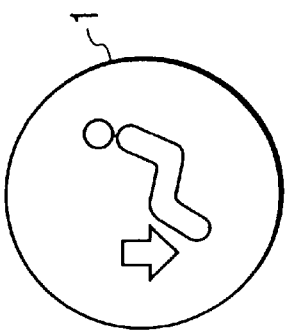
Figure 5C:
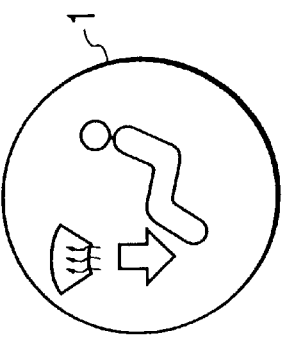
Figure 5D:
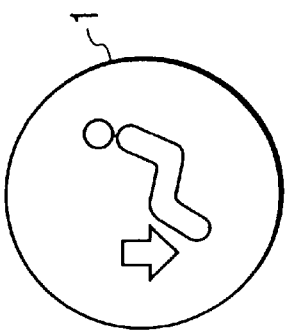
Figure 5E:
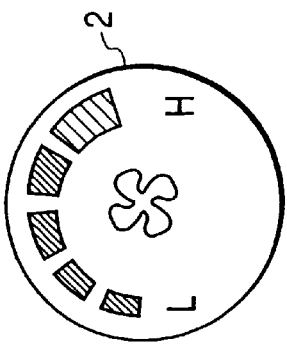
Figure 5F:
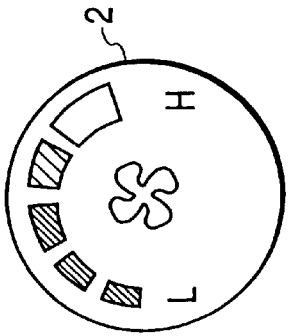
Figure 5G:
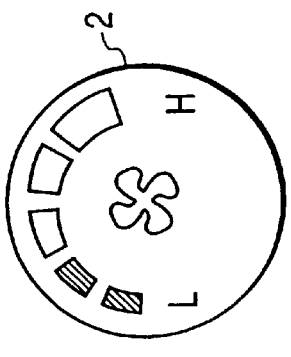
Figure 5H:
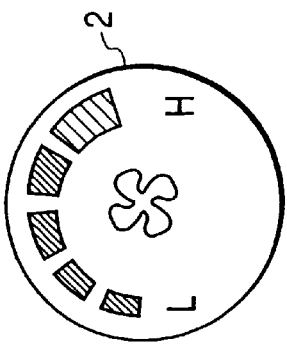
Figure 6:
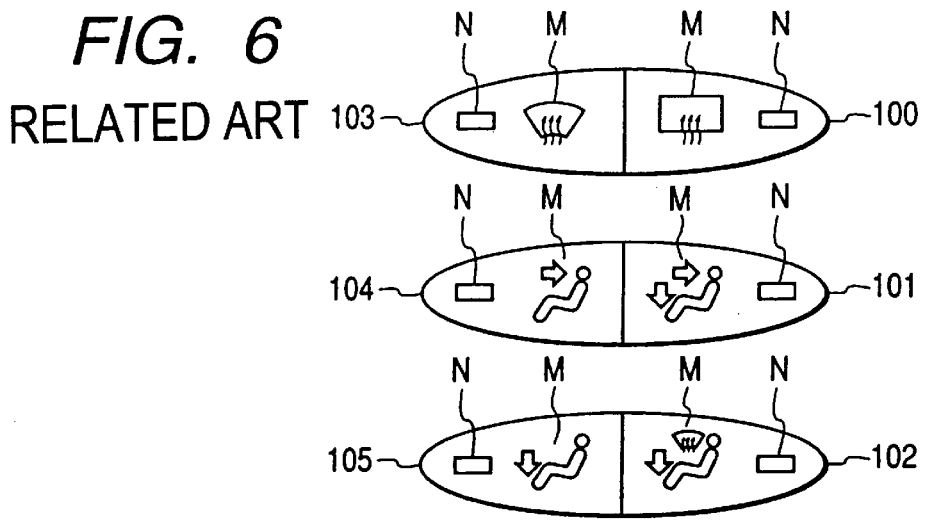
FIG. 6 is a front view showing an operation switch according to the conventional first system.
Figure 7:
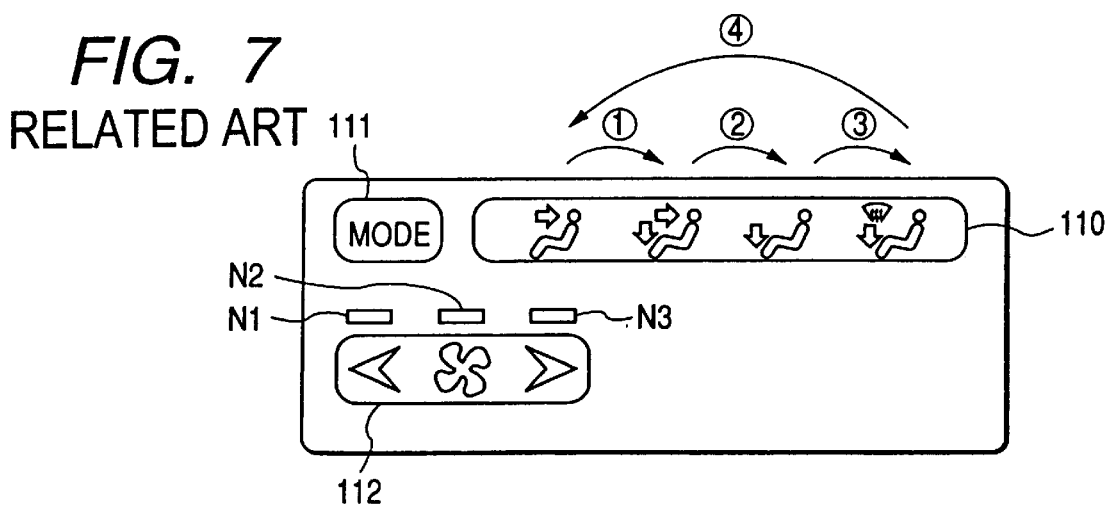
FIG. 7 is a front view showing an operation switch according to the conventional second system.
Figure 8:
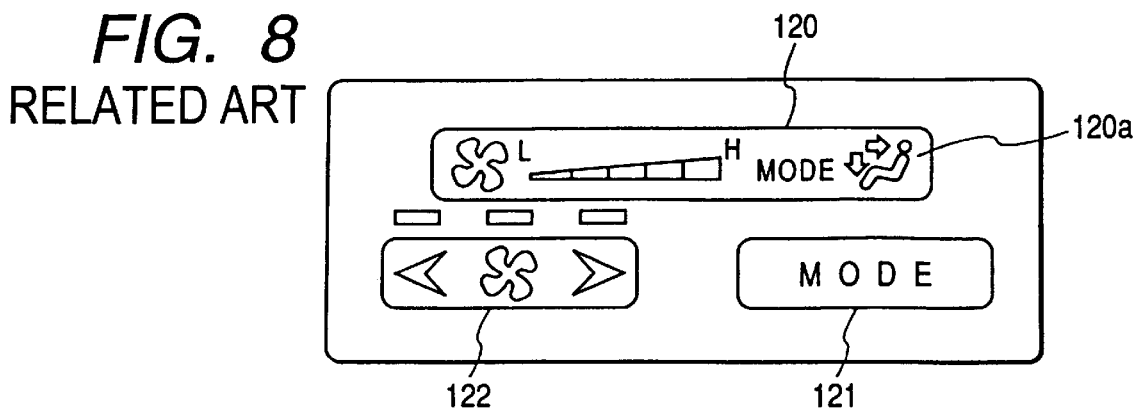
FIG. 8 is a front view showing an operation switch according to the conventional third system.

The structure of the lower side push knob 2 for adjusting an air flow rate is arranged as shown in FIGS. 1 and 2 to include a print circuit board 22 having a push-type switch element 20 and eight light sources 21a, 21b, 21c, 21d, 21e, 21f, 21g and 11h formed by LEDs or the like, a switch guide 23 (refer to FIG. 3) having the same configuration as the switch guide 13 used in the upper side push knob 1, a base switch 24 shown in FIG. 4 and a smoke plate 25.

The smoke plate 25 is formed by semitransparent resin plate or the like. The smoke plate 25 is provided with a plurality of function displays relating to the adjustment of an air flow rate. For example, in the example shown in the figure, a blower mark 25a, an L-shaped display 25b representing an air flow rate decreasing direction and an H-shaped display 25c representing an air flow rate increasing direction are displayed in a manner of the paint omitting display, and further five increment/decrement amount displays 25d, 25e, 25f, 25g and 25h are displayed with different width sizes in a manner of the paint omitting display. On the inner surface side of the smoke plate 25, the entire surface or the paint omitting display portions thereof is subjected to the light diffusion painting. Incidentally, the paint omitting display and the light diffusion painting may be effected on the outer surface side of the smoke plate 25.

The base switch 24 is arranged in a manner that a brim portion 24b is formed at the intermediate portion along the vertical direction on the outer side of a cylindrical member 24a, and an upper lid portion 24c is formed at the inner side of the cylindrical member 24a. Further, side walls 24d, 24e, 24f, 24g, 24h and 24i are formed so as to hang down from the upper lid portion 24c thereby to form a plurality of rooms E, F, G, H, I and J, respectively. The room E corresponds to the blower mark 25a, the L-shaped display 25a and the H-shaped display 25c, the room F corresponds to the increment/decrement amount display 25d, the room G corresponds to the increment/decrement amount display 25e, the room H corresponds to the increment/decrement amount display 25f, the room I corresponds to the increment/decrement amount display 25g, and the room J corresponds to the increment/decrement amount display 25h. These rooms E to J are formed in a manner that opening shapes thereof respectively corresponding to the shapes of the blower mark 25a to the increment/decrement amount display 25h are formed continuously along the vertical direction while maintaining the shapes. The light sources 21a to 21h are disposed in correspondence to the function display portions of the blower mark 25a or the like of the respective rooms E to J, as shown in FIGS. 1 and 2. To be more concrete, the light source 21a, the light source 21b, the light source 21c, the light source 21d, the light source 21e, the light source 21f, the light source 21g and the light sources 21h are disposed in correspondence to the blower mark 25a of the room E, the L-shaped display 25b of the room E, the H-shaped display 25c of the room E, the increment/decrement amount display 25d of the room F, the increment/decrement amount display 25e of the room G, the increment/decrement amount display 25f of the room H, the increment/decrement amount display 25g of the room I and the increment/decrement amount display 25h of the room J, respectively.

As shown in FIG. 2, an inner side cylindrical portion 24j is formed at the center portion on the lower side of the upper lid portion 24c so that the inner side cylindrical portion pushes the push-type switch element 20 (refer to FIG. 1) to change the terminals. Further, a convex portion 24k which engages with a groove 23b formed at a substantially cylindrical portion 23a of the switch guide 23 (refer to FIG. 3) same as the switch guide used in the upper side push knob 1 is formed on the inner surface side of the cylindrical member 24a. The convex portion 24k engages with the groove 23b of the switch guide 23, so that the base switch 24 is made impossible to rotate relative to the switch guide 23. In FIG. 3, a reference numeral 23c depicts a mounting base corresponding to the mounting base 13c, and a reference numeral 23d are mounting holes corresponding to the mounting holes 13d.

As described above, the print circuit board 22 is provided with the push-type switch element 20 and the eight light sources 21a, 21b, 21c, 21d, 21e, 21f, 21g and 11h formed by LEDs or the like. When the push-type switch element 20 is switched, a not-shown control circuit controls to turn on and off the eight light sources 21a to 21h in response to the switching operation and a not-shown opening/closing means is controlled to blow air in accordance with the selected blowing function.

FIG. 5A, FIG. 5B, FIG. 5C, FIG. 5D, FIG. 5E, FIG. 5F, FIG. 5G and FIG. 5H are diagrams showing the display contents of the operation switch according to the embodiment thus arranged. In the figure, FIG. 5A, FIG. 5B, FIG. 5C and FIG. 5D show the changes of the display when the upper side push knob 1 for adjusting the blowing direction is switched, whilst FIG. 5E, FIG. 5F, FIG. 5G and FIG. 5H show the changes of the display when the lower side push knob 2 for adjusting an air flow rate is switched.

For example, when the upper side push knob 1 in the display state (a) is pushed, the display state changes into (b). When the push knob 1 is further pushed, the display state changes into (c). Then, when the push knob 1 is further pushed, the display state changes into (d). When the push knob 1 is further pushed, the display state returns to (a). In this manner, the aforesaid operation is repeated hereinafter in response to the pushing operation of the upper side push knob.

On the other hand, for example, when the lower side push knob 2 in the display state (e) is pushed, the display state changes into (f). When the push knob 2 is further pushed, the display state changes into (g). Then, when the push knob 2 is further pushed, the display state changes into (h). When the push knob 2 is further pushed, the display state returns to (e). In this manner, the aforesaid operation is repeated hereinafter in response to the pushing operation of the lower side push knob.

Accordingly, the present embodiment is arranged in a manner that the blowing direction is adjusted by the single push knob 1 and an air flow rate is adjusted by the single push knob 2. Further, since each of the push knobs 1 and 2 is provided with the display function, it is possible to secure the good operability and a sufficient area for display portions even if the space for the operation switch is small. Further, since the desired light source is turned on in response to the operation of the push knob to mainly brighten the corresponding room thereby to clearly indicate the function display relating to the room, the function selected by the operation of the switch knob can be confirmed with high visibility. In this case, since the light transmitted through the paint omitting display portion of the semitransparent smoke plate is diffused by the light diffusion painting, the selected function can be confirmed visually more easily. Furthermore, since the function display relating to the adjustment of the blowing direction or the adjustment of an air flow rate is changed sequentially in the predetermined order each time the push knob 1 or 2 is pushed once, an operator can operate the operation switch more easily as the operator is accustomed to the operation thereof.

In the aforesaid embodiment, the display relating to the adjustment of an air flow rate is arranged in a manner that an air flow rate is determined from the number of increment/decrement amount displays being displayed or lightened among the five increment/decrement amount displays 25d to 25h. Alternatively, the display relating to the adjustment of an air flow rate may be arranged in a manner that numerals in a range of 1 to 5 are used for representing the magnitudes of the air flow rate and one of these numerals representing the current air flow rate is displayed at a single display portion.

Although, in the aforesaid embodiment, the semitransparent resin plate is used as the smoke plates 15 and 25, the present invention is not limited thereto, and a transparent resin plate or a glass plate may be used as the smoke plate in place of the semitransparent resin plate.

Further, although in the aforesaid embodiment the push-type switch elements are used as the switch elements, the present invention is not limited thereto, and the present invention can attain the similar effect by using rotation-operation type switch elements as the switch elements. For example, the rotation-operation type switch element may be arranged in a manner that an engaging portion for engaging with the rotation-operation type switch element is provided at the rear surface side of the rotation center portion of a dial knob, then the engaging portion is engaged with the rotation-operation type switch element, then the engaging portion is coupled to the outer peripheral portion of the dial knob through one or at least two thin coupling portions, then the portion not coupled to the coupling portions is used as a display portion(s), and it is configured that only the outer peripheral portion of the dial knob rotates. In this case, it is preferable to arrange in such a manner, since the operability can be improved, that at the time of selecting the function by rotating the outer peripheral portion of the dial knob, the functions change in a predetermined order each time the outer peripheral portion of the dial knob rotates by a constant angle (or a constant angle range).

Further, although in the aforesaid embodiment the operation switch according to the present invention is applied to the operation portion of the air conditioner disposed within a vehicle, the present invention is not limited thereto, and the present invention may be applied to the operation portion of an audio reproducing device disposed within a vehicle in the similar manner.

As described in detail above, the present invention is arranged in a manner that one or at least two switch knobs each for selecting one of related plural functions is provided, and a display portion for displaying the one of related plural functions selected by the corresponding switch knob is provided for each of the switch knobs. Thus, when one of the switch knobs is operated, the desired function relating to the switch knob thus operated can be selected among the plural functions and also the selected function can be displayed at the switch knob thus operated. Accordingly, it is possible to secure the good operability and a sufficient area for a display portion even if the space for the operation switch is small.

What is claimed is:

1. An operation switch, comprising:
   at least one switch knob that selects one of related multiple functions; and
   a display portion, provided for the at least one switch knob, that displays the one of the multiple functions selected by the at least one switch knob, wherein said at least one switch knob is subjected to a constant operation and each time the at least one switch knob is subjected to a constant operation the related multiple functions are changed sequentially in a predetermined order.

2. An operation switch as claimed in claim 1, wherein a switch element that selects the related multiple functions is provided on a rear surface side of said at least one switch knob.

3. An operation switch as claimed in claim 1, wherein said display portion has a plurality of rooms provided within said at least one switch knob, light sources respectively provided in said plurality of rooms and function displays respectively being positioned so that they may be clearly visible by turning said light sources on, and said display portion is arranged in a manner that, when said switch knob is operated, a desired one of said light sources is turned on to display the one of the related multiple functions selected by an operation of said switch knob.

4. An operation switch as claimed in claim 3, wherein said function displays are formed on a transparent or semitransparent plate.

5. An operation switch as claimed in claim 4, wherein said function displays are formed on said plate in a manner of paint omitting display and said plate is subjected to light diffusion painting.

6. An operation switch as claimed in claim 1, wherein said at least one switch knob is formed by a push knob which selects one of the related multiple functions when being pushed.

\* \* \* \* \*

UNITED STATES PATENT AND TRADEMARK OFFICE
CERTIFICATE OF CORRECTION

PATENT NO.    : 6,207,913 B1
DATED         : March 27, 2001
INVENTOR(S)   : Hirokatsu Nakajima et al.

It is certified that error appears in the above-identified patent and that said Letters Patent is hereby corrected as shown below:

<u>Title page,</u>
Item [73], please change:
"Assignee: Harness System Technologies Research, Ltd., Nagoya (JP)" to
-- Assignee: Harness System Technologies Research, Ltd., Nagoya (JP); Sumitomo Wiring Systems Ltd., Yokkaichi (JP); and Sumitomo Electric Industries, Ltd., Osaka (JP) --

Signed and Sealed this

Seventh Day of May, 2002

Attest:

JAMES E. ROGAN
*Attesting Officer*        *Director of the United States Patent and Trademark Office*